US009957882B2

(12) United States Patent
Kemmerling et al.

(10) Patent No.: US 9,957,882 B2
(45) Date of Patent: May 1, 2018

(54) INTERNAL COMBUSTION ENGINE WITH TURBINE

(71) Applicant: Ford Global Technologies, LLC, Dearborn, MI (US)

(72) Inventors: Joerg Kemmerling, Monschau (DE); Helmut Matthias Kindl, Aachen (DE); Vanco Smiljanovski, Bedburg (DE); Franz Arnd Sommerhoff, Aachen (DE); Andreas Kuske, Geulle (NL); Frank Wunderlich, Herzogenrath (DE)

(73) Assignee: Ford Global Technologies, LLC, Dearborn, MI (US)

( * ) Notice: Subject to any disclaimer, the term of this patent is extended or adjusted under 35 U.S.C. 154(b) by 170 days.

(21) Appl. No.: 15/012,594

(22) Filed: Feb. 1, 2016

(65) Prior Publication Data
US 2016/0230649 A1    Aug. 11, 2016

(30) Foreign Application Priority Data
Feb. 9, 2015    (DE) .................. 10 2015 202 224

(51) Int. Cl.
| F02B 37/18 | (2006.01) |
| F01D 17/10 | (2006.01) |
| F02B 39/16 | (2006.01) |
| F02C 6/12  | (2006.01) |

(52) U.S. Cl.
CPC .......... *F02B 37/183* (2013.01); *F01D 17/105* (2013.01); *F02B 39/16* (2013.01); *F02C 6/12* (2013.01); *F02B 2039/166* (2013.01); *Y02T 10/144* (2013.01)

(58) Field of Classification Search
CPC ...... F01D 17/105; F02B 37/183; F02B 39/16; F02B 2039/166; F02C 6/12; Y02T 10/144
See application file for complete search history.

(56) References Cited

U.S. PATENT DOCUMENTS

| 4,120,156 | A  |   | 10/1978 | McInerney |
| 4,499,731 | A  | * | 2/1985  | Moser .................. F01D 17/105 415/157 |
| 8,037,683 | B2 | * | 10/2011 | Wirbeleit ............... F01D 17/12 60/602 |
| 8,104,281 | B2 |   | 1/2012  | Wade et al. |
| 8,234,865 | B2 |   | 8/2012  | Andrews |

(Continued)

FOREIGN PATENT DOCUMENTS

| DE |   3941715 A1 |   | 6/1991 |                |
| DE | 102010000222 | * | 8/2010 | ............. F01D 9/026 |

(Continued)

OTHER PUBLICATIONS

Machine Translation of DE 102010000222 A1.*

*Primary Examiner* — Brandon Lee
(74) *Attorney, Agent, or Firm* — Julia Voutyras; McCoy Russell LLP (57) ABSTRACT

Methods and systems are provided for controlling a turbine within an internal combustion engine. In one example, a turbine system within an internal combustion engine may include at least one turbine with a housing that may further include at least one impeller mounted on a rotatable shaft, inlet and outlet regions, and at least one overpressure line including a self-controlling valve for controlling the flow of exhaust gas.

13 Claims, 4 Drawing Sheets

(56) References Cited

U.S. PATENT DOCUMENTS

| | | | |
|---|---|---|---|
| 2004/0011052 A1* | 1/2004 | Clements | F02C 9/263 |
| | | | 60/773 |
| 2012/0055152 A1 | 3/2012 | Petrovic | |
| 2012/0055424 A1* | 3/2012 | Kuhlbach | F02B 33/44 |
| | | | 123/41.31 |

FOREIGN PATENT DOCUMENTS

| | | |
|---|---|---|
| DE | 102010000222 A1 | 8/2010 |
| DE | 102009012252 A1 | 9/2010 |
| EP | 1433937 A1 | 6/2004 |
| GB | 1041842 A | 9/1966 |

\* cited by examiner

INTERNAL COMBUSTION ENGINE WITH TURBINE

CROSS REFERENCE TO RELATED APPLICATION

The present application claims priority to German Patent Application No. 102015202224.2, filed Feb. 9, 2015, the entire contents of which are hereby incorporated by reference for all purposes.

FIELD

The present description relates generally to methods and systems for controlling a turbine within an internal combustion engine.

BACKGROUND/SUMMARY

Internal combustion engines have a cylinder block and at least one cylinder head which are connected to one another to form the cylinders of the engine. During the charge exchange, the combustion gases are discharged via the outlet openings and the charging of the cylinders takes place via the inlet openings. In order to control the charge exchange, an internal combustion engine requires control elements such as lifting valves and actuating devices for actuating the control elements. The valve actuating mechanism required for the movement of the valves, including the valves themselves, is referred to herein as the valve drive.

According to the prior art, the exhaust lines which adjoin the outlet openings of the cylinders are at least partially integrated into the cylinder head and are merged to form a single overall exhaust line or a plurality of overall exhaust lines. The merging of exhaust lines to form an overall exhaust line is referred to herein as an exhaust manifold.

Downstream of the at least one manifold, the exhaust gases are then commonly supplied to a turbine. For example, the turbine of an exhaust gas turbocharger, and if appropriate, are conducted through one or more exhaust gas aftertreatment systems.

However, the inventors herein have recognized potential issues with such systems. As one example, according to the prior art, turbines are, in terms of the dimensioning, designed with a certain safety margin in order to avoid excessively high pressures in the inlet region. Taking a maximum expected exhaust gas mass flow at a particular pressure and temperature as a starting point, the turbine is designed with a flow cross section approximately 10% to 15% larger than is theoretically required, or would theoretically be necessary for the exhaust gas mass flow to be handled. The background to this measure is that the pressure in the inlet region of the turbine should not exceed a pre-definable admissible pressure. For example, if the actual exhaust gas mass flow exceeds the maximum expected exhaust gas mass flow in individual cases, and/or the exhaust gas pressure is temporarily and unexpectedly higher than the maximum expected exhaust gas pressure.

The exhaust gas pressure upstream of the at least one impeller must not become arbitrarily high, because it might otherwise be possible for an outlet valve to be opened counter to the spring force of the valve spring of the valve drive. This may result in the valve spring forcing the valve into the direction of the valve's closed position. Eliminating this risk by way of a stronger valve spring is not expedient, as this may increase the friction losses within the valve drive.

The provision of a safety margin in terms of the dimensioning yields numerous disadvantages. The larger turbine that may be used has a higher weight and may be more voluminous, giving rise to an increased space requirement. The at least one impeller may therefore be of correspondingly larger dimensions and have greater inertia. For this reason, the turbine exhibits a relatively poor response behavior. The main disadvantage, however, is the relatively poor efficiency of the relatively larger turbine which, during operation, is acted on primarily with exhaust gas mass flows smaller than the exhaust gas mass flows that could actually be handled. Such a turbine exhibits highly unsatisfactory operating behavior in the presence of small exhaust gas mass flows. It is here in particular that the large design of the turbine owing to the safety margin has a disadvantageous effect. In this way, it may be desirable to employ an internal combustion engine system having a turbine of a smaller size.

The above statements apply not only to turbines which have a fixed, non-variable geometry but also to turbines with variable turbine geometry. In the case of turbines of the latter type, the provision of a safety margin is allowed for such that the maximum expected exhaust gas mass flow at a particular pressure and a particular temperature is handled with an approximately 85% to 90% open flow cross section. To be able to counteract higher exhaust gas pressures than expected, or to be able to manage greater exhaust gas than expected, it is then possible for the variable turbine geometry to be adjusted further. That is to say, the flow cross section can be opened still further.

Against the background of that stated above, it is an object of the present subject matter to provide an internal combustion engine according to the preamble of claim 1, which is optimized with regard to the problem of an excessively high pressure in the inlet region of the turbine.

Said object may be achieved by means of an internal combustion engine comprising at least one turbine with a turbine housing in which there may be arranged at least one impeller which may be mounted on a rotatable shaft, in which internal combustion engine, the turbine housing has an inlet region for the supply of exhaust gas. The inlet region being arranged upstream of the at least one impeller and the outlet region, which belongs to an exhaust gas discharge system, being arranged downstream of the at least one impeller and adjoining the at least one impeller. At least one exhaust gas-conducting flow duct may be provided which connects the inlet region to the outlet region via the impeller, and wherein, at least one overpressure line may be provided which branches off from the at least one exhaust gas-conducting flow duct upstream of the outlet region and which opens into the exhaust gas discharge system downstream of the at least one impeller, wherein a self-controlling pressure valve may be arranged in the overpressure line.

According to the present subject matter, at least one overpressure line may be provided in the turbine housing. Each overpressure line may further be equipped with a self-controlling pressure valve which opens automatically when the pressure in the inlet region of the turbine exceeds a pre-definable pressure. This may serve to prevent excessively high pressures from prevailing in the inlet region.

As a result, it may no longer be necessary for the turbine to be designed with a certain safety margin in mind. That is to say, the turbine may no longer need to be designed to be larger than is realistically necessary for the exhaust gas mass flow to be handled safely. The omission of said safety margin-induced over-dimensioning may lead to a smaller turbine, which may then have a lower weight and may be less voluminous. The response behavior is likewise improved owing to the lower inertia of the rotor. Further, the efficiency of said smaller turbine may be higher, and in particular, the operating behavior in the presence of relatively small exhaust gas mass flows may considerably be improved.

In one example, the issues described above may be addressed by an internal combustion engine comprising at least one turbine with a turbine housing in which there is arranged at least one impeller which is mounted on a rotatable shaft, in which internal combustion engine, the turbine housing has an inlet region for the supply of exhaust gas, the inlet region being arranged upstream of the at least one impeller and the outlet region, which belongs to an exhaust gas discharge system, being arranged downstream of the at least one impeller and adjoining the at least one impeller, at least one exhaust gas conducting flow duct is provided which connects the inlet region to the outlet region via the impeller, wherein at least one overpressure line is provided which branches off from the at least one exhaust gas-conducting flow duct upstream of the outlet region and which opens into the exhaust gas discharge system downstream of the at least one impeller, wherein a self-controlling pressure valve is arranged in the overpressure line. In this way, it may no longer be necessary for the turbine to be designed with a certain safety margin. In other words, it may not be necessary to design the turbine to be larger than is necessary for the exhaust gas mass flow to be handled.

As one example, in the case of turbines with variable turbine geometry, the maximum expected exhaust gas mass flow of a particular pressure and a particular temperature is managed with the flow cross section fully open. In the presence of higher exhaust gas pressures, the geometry is not opened further, as it is already fully open. Rather, the overpressure valve automatically opens when the pressure in the inlet region of the turbine exceeds a pre-definable pressure. By doing this, the turbine pressure and the engine backpressure may boost the turbine speed automatically.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-3 are shown approximately to scale although other relative dimensions may be used.

DETAILED DESCRIPTION

Figure 1:
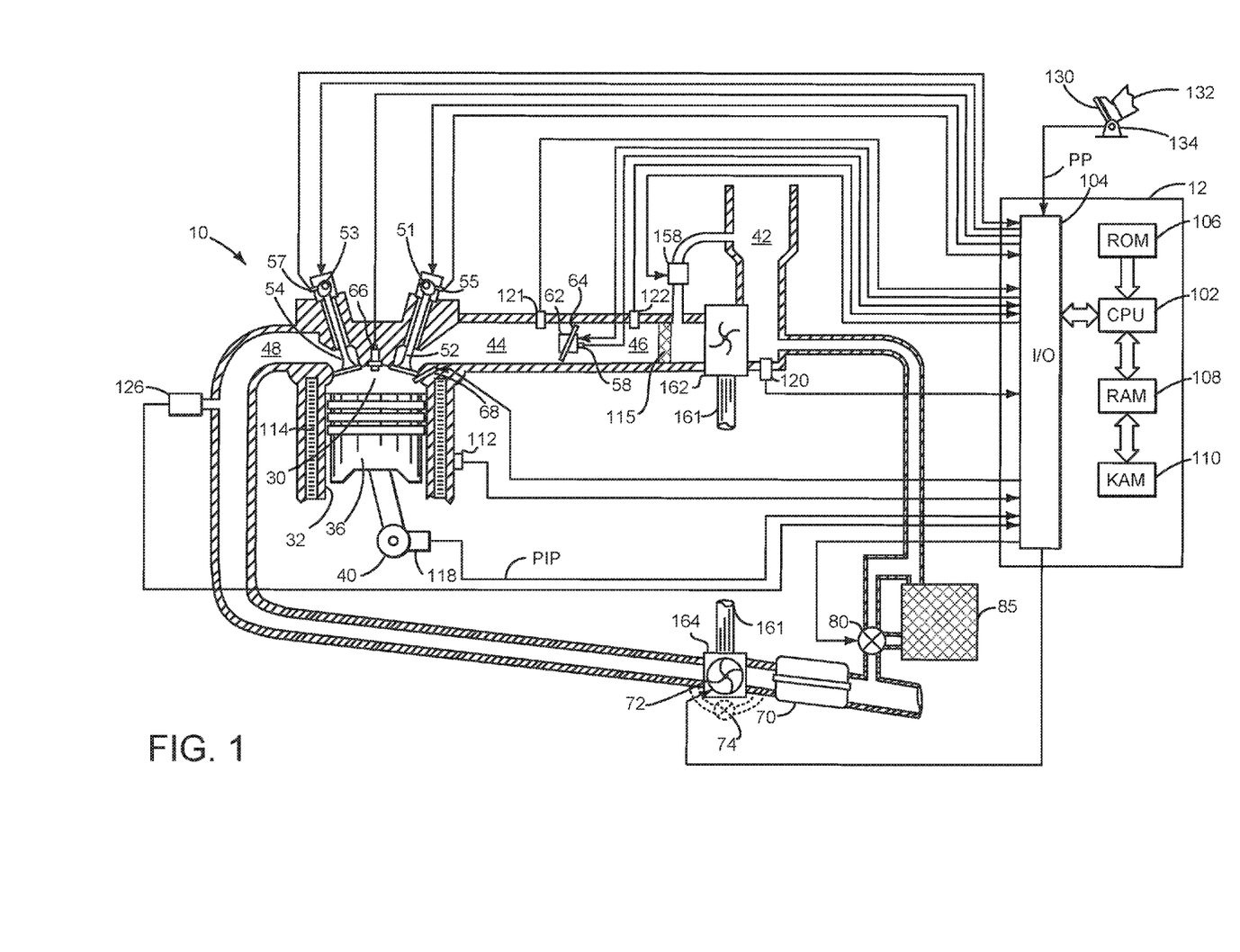
FIG. 1 shows a schematic depiction of an engine.

The following description relates to systems and methods for controlling a turbine within an internal combustion engine. Specifically, this description relates to controlling a turbine such as turbine systems 200 and 300 of FIGS. 2 and 3 respectively, which may include at least one overpressure line in the housing of the turbine. Further, the turbine systems of FIGS. 2-3 may include overpressure lines equipped with a self-controlling pressure valve which may open automatically when pressure from within an inlet region of the turbine begins to exceed a certain pre-definable pressure. FIG. 1 shows an example internal combustion engine inclusive of a turbine.

Figure 2:
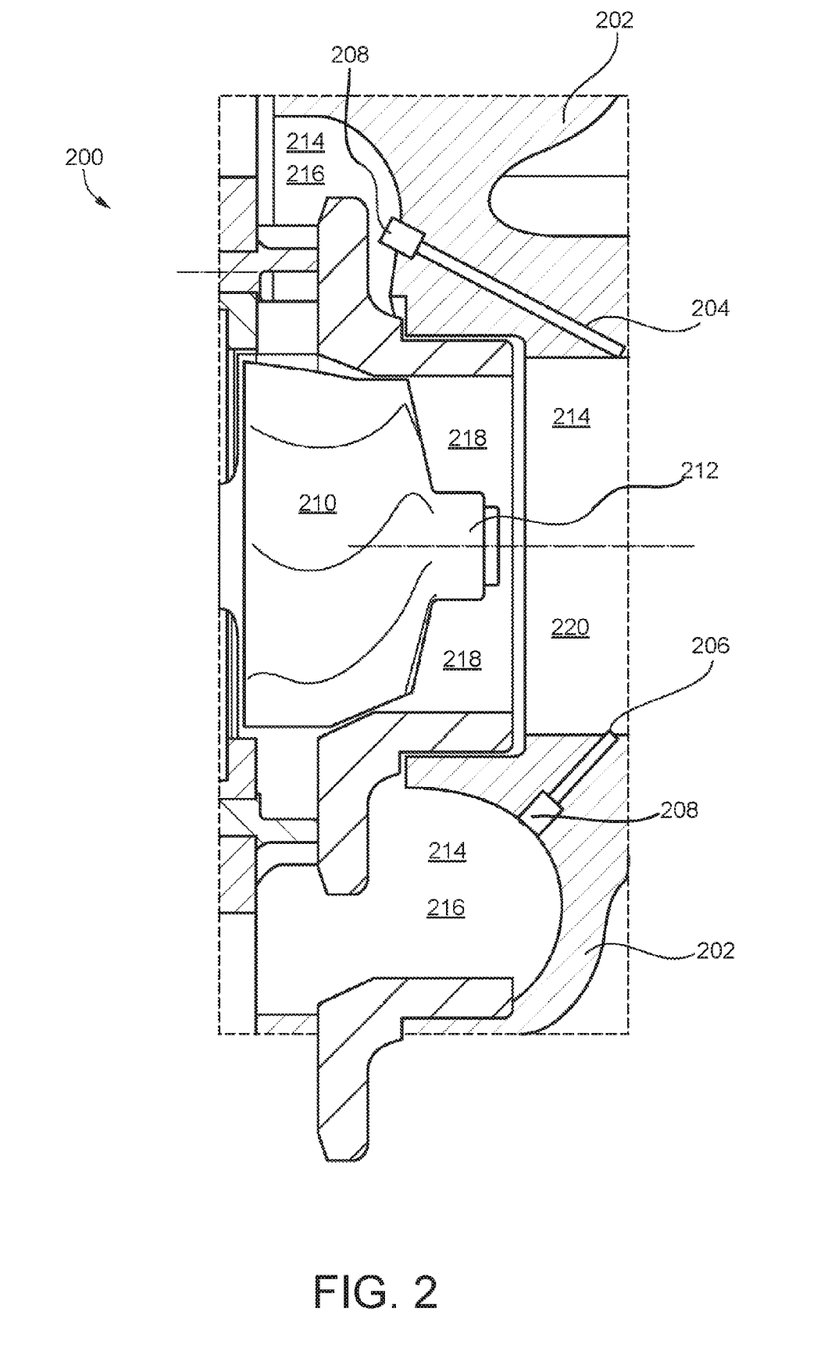
FIG. 2 shows the turbine of a first embodiment of the internal combustion engine with turbine, partially bisected along the shaft of the turbine impeller.
Figure 3:
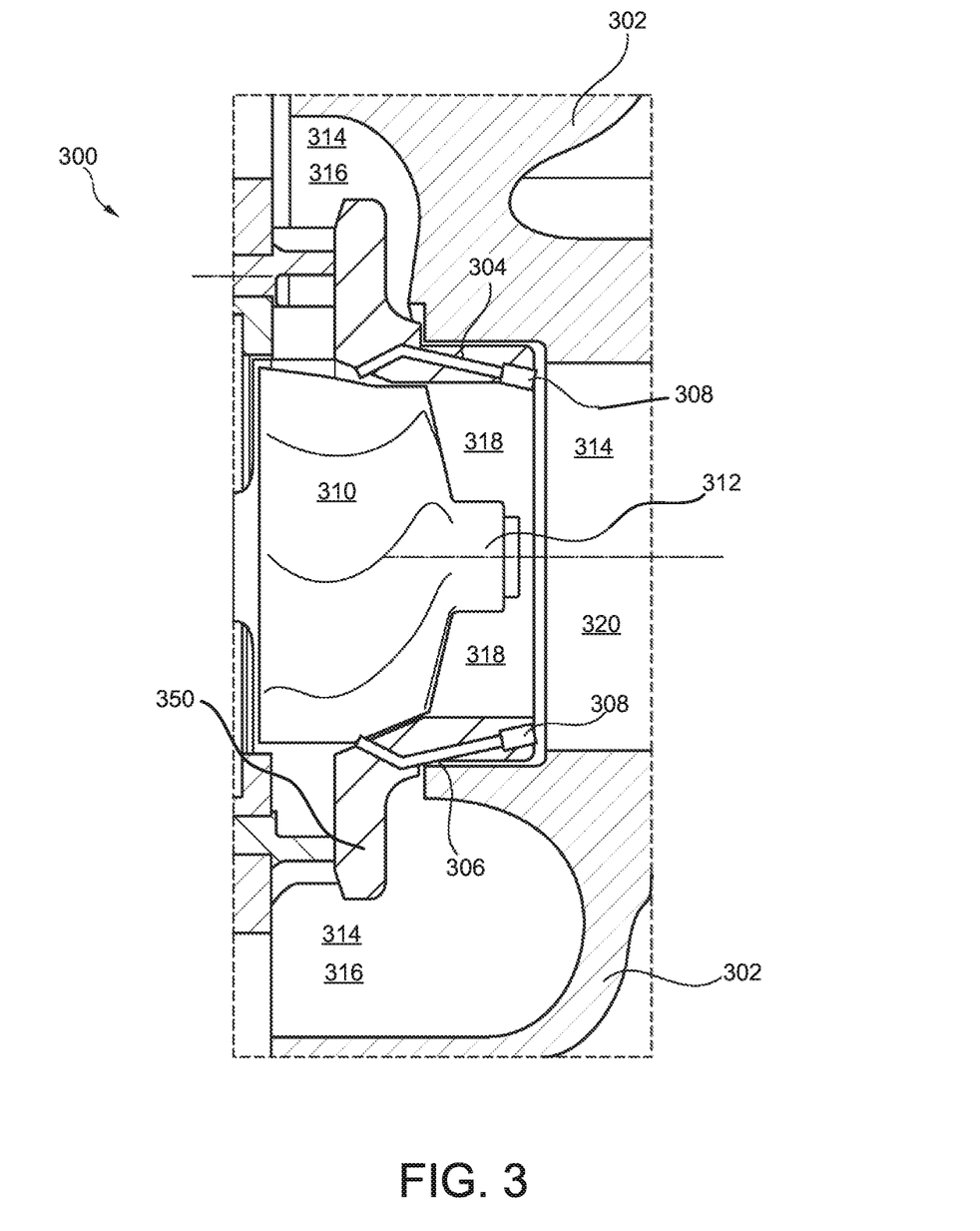
FIG. 3 shows the turbine of a second embodiment of the internal combustion engine with turbine, partially bisected along the shaft of the turbine impeller.

The turbine 164 of FIG. 1 is further illustrated in FIG. 2 by a first embodiment of an example internal combustion engine turbine 200. In this example embodiment, overpressure lines 204, 206 may be provided that branch off from an exhaust gas-conducting flow duct 214 which may lie within an inlet region 216 of the engine system. FIG. 3 illustrates another example turbine system within an internal combustion engine where overpressure lines 304, 306 may be provided wherein the overpressure lines may positioned such that they branch off from the exhaust gas-conducting flow duct of the impeller 310 of the engine. Particularly, these two example embodiments of a turbine system provided may comprise a radial turbine in which the flow of a working fluid may be radial with respect to the shaft to which it may be affixed.

It will be appreciated that the turbine systems of the present disclosure may be applicable to turbine systems that are radial, axial or otherwise, and the example embodiments provided herein are not to be viewed in a limiting manner. That is, the technology described in this disclosure with respect to turbine systems, may be applied to systems in which a turbine is present and where there may be a need for overpressure control.

In one example, an internal combustion engine may comprise at least one turbine with a turbine housing in which there is arranged at least one impeller which is mounted on a rotatable shaft, in which internal combustion engine, the turbine housing has an inlet region for the supply of exhaust gas, the inlet region being arranged upstream of the at least one impeller and the outlet region, which belongs to an exhaust gas discharge system, being arranged downstream of the at least one impeller and adjoining the at least one impeller, at least one exhaust gas conducting flow duct is provided which connects the inlet region to the outlet region via the impeller, wherein at least one overpressure line is provided which branches off from the at least one exhaust gas-conducting flow duct upstream of the outlet region and which opens into the exhaust gas discharge system downstream of the at least one impeller, wherein a self-controlling pressure valve is arranged in the overpressure line. In this way, it may no longer be necessary for the turbine to be designed with a certain safety margin. In other words, it may not be necessary to design the turbine to be larger than is necessary for the exhaust gas mass flow to be handled.

As yet another example, in the case of turbines with variable turbine geometry, the maximum expected exhaust gas mass flow of a particular pressure and a particular temperature is managed with the flow cross section fully open. In the presence of higher exhaust gas pressures, the geometry is not opened further, as it is already fully open. Rather, the overpressure valve automatically opens when the pressure in the inlet region of the turbine exceeds a pre-definable pressure. By doing this, the turbine pressure and the engine backpressure may boost the turbine speed automatically.

As one embodiment provides, the internal combustion engine may comprise at least one turbine having overpressure lines that open into the outlet region downstream of the provided impeller and may branch off from the exhaust gas-conducting flow duct. A further embodiment may provide that the overpressure line(s) may branch off from the exhaust gas-conducting flow duct in the inlet region upstream of the impeller and may include a pressure valve arranged at the inlet side of the overpressure line. Alternatively an additional embodiment may include a pressure valve arranged at the outlet side of the overpressure line. In some examples a plurality of overpressure lines may be provided. The provided overpressure line(s) may be arranged at an inlet upstream or downstream of the turbine's impeller, or may be arranged at an outlet upstream or downstream of the turbine's impeller.

Referring now to FIG. 1, internal combustion engine 10, comprising a turbine 164 is shown. The internal combustion engine 10 of FIG. 1 may be controlled by an electronic engine controller 12 and may further include a combustion chamber 30. Combustion chamber 30 is shown communicating with an intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. Further, the position of exhaust cam 53 may be determined by exhaust cam sensor 57.

A fuel injector 66 is shown positioned to inject fuel directly into combustion chamber 30, which is known to those skilled in the art as direct injection. Fuel injector 66 delivers fuel in proportion to a pulse width from controller 12. Fuel may be delivered to fuel injector 66 by a fuel system (not shown) including a fuel tank, fuel pump, fuel rail (not shown). Fuel pressure delivered by the fuel system may be adjusted by varying a position valve regulating flow to a fuel pump (not shown). In addition, a metering valve may be located in or near the fuel rail for closed loop fuel control. A pump metering valve may also regulate fuel flow to the fuel pump, thereby reducing fuel pumped to a high pressure fuel pump.

Intake manifold 44 is shown communicating with optional electronic throttle 62 which adjusts a position of throttle plate 64 to control air flow from intake boost chamber 46. Compressor 162 draws air from air intake 42 to supply boost chamber 46. Exhaust gases spin turbine 164 which is coupled to compressor 162 via shaft 161. Charge air cooler 115 cools air compressed by compressor 162. Compressor speed may be adjusted via adjusting a position of variable vane control 72 or compressor bypass valve 158. In alternative examples, a waste gate 74 may be used in addition to a variable vane control 72. Variable vane control 72 adjusts a position of variable geometry turbine vanes. Exhaust gases may pass through the turbine 164 and impart increased force on turbine 164 when vanes are in a closed position. Alternatively, a turbine of the present disclosure may replace or be used in conjunction with a waste gate 74 to allow exhaust gases to flow through or bypass the turbine 164 so as to reduce the amount of energy supplied to the turbine. Compressor bypass valve 158 may allow compressed air at the outlet of compressor 162 to be returned to the input of compressor 162. In this way, the efficiency of compressor 162 may be reduced so as to affect the flow of compressor 162 and reduce intake manifold pressure.

In embodiments provided herein, the addition or inclusion of a waste gate 74 may no longer be necessary due to the potential for the pressure valves within supplied overpressure lines to control the release and withholding of exhaust gas from within the turbine assembly's inlet and outlet sections. Specifically, waste gates 74 are typically used to divert exhaust gas mass flow around and away from turbines in instances of high pressure. In example embodiments provided herein and described in greater detail below with respect to FIGS. 2 and 3, the provided pressure valves may allow for exhaust gas mass flow to flow continuously through the turbine and into an emissions device 70 while still providing a variable output mass flow.

Combustion within the engine system 10 may be initiated in combustion chamber 30 when fuel ignites via compression ignition as a piston 36 approaches top-dead-center compression stroke. In some examples, a universal Exhaust Gas Oxygen (UEGO) sensor 126 may be coupled to exhaust manifold 48 upstream of emissions device 70. In other examples, the UEGO sensor may be located downstream of one or more exhaust after treatment devices. Further, in some examples, the UEGO sensor may be replaced by a NOx sensor that may be inclusive of both NOx and oxygen sensing elements.

At lower engine temperatures glow plug 68 may convert electrical energy into thermal energy so as to raise a temperature in combustion chamber 30. By raising the temperature of combustion chamber 30, it may be easier to ignite a cylinder air-fuel mixture via compression. Controller 12 may then adjust an amount of electrical power supplied to glow plug 68. Glow plug 68 protrudes into the cylinder and it may also include a pressure sensor integrated with the glow plug for determining pressure within combustion chamber 30.

An emission control device 70 may include a particulate filter and catalyst bricks, in one example. In another example, multiple emission control devices, each having multiple bricks, may be used. Further, emission device 70 may include an oxidation catalyst in one example. In other examples, the emissions device may include a lean NOx trap or a selective catalyst reduction (SCR), and/or a diesel particulate filter (DPF). The emission device 70 of engine system 10 may be placed downstream in the engine's exhaust system relative to the turbine 164 such that the exhaust gas supplied to the turbine 164 can be converted to a form safe to release into the atmosphere.

Exhaust gas recirculation (EGR) may be provided to the engine via an EGR valve 80. EGR valve 80 may be a three-way valve that closes or allows exhaust gas to flow from downstream of the emissions device 70 to a location in the engine air intake system upstream of compressor 162. In alternative examples, EFT may flow from upstream of the turbine 164 to intake manifold 44. EGR may bypass EGR cooler 85, or alternatively, EGR may be cooled via passing through EGR cooler 85. In other examples, high pressure and low pressure EGR systems may be provided.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to a cooling sleeve 114; a position sensor 134 coupled to an accelerator pedal 130 for sensing accelerator position adjusted by a driver 132; a measurement of engine manifold pressure (MAP) from pressure sensor 121 coupled to intake manifold 44; boost pressure from pressure sensor 122 exhaust gas oxygen concentration from oxygen sensor 126; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In one example embodiment of the present description, an engine position sensor 118 may produce a predetermined number of equally spaced pulses for every revolution of the crankshaft from which engine speed (RPM) may be determined. The controller 12 of the engine system may further act to control and subsequently actuate the valves of overpressure lines that may be provided in example embodiments of the turbine 164 of an internal combustion engine with turbine.

During operation, the turbine 162 of engine system 10 may collect engine exhaust gas, utilizing its energy to spin an impeller which may then be connected to a rotatable shaft 161 which may also be connected to the engine's compressor 162. The compressor 162 may then supply cooled, compressed air to supply the boost chamber 46 of the engine system 10.

The system of FIG. 1 provides for an internal combustion engine comprising: an exhaust gas discharge system; and at least one turbine comprising at least a turbine housing, and an impeller mounted on a rotatable shaft, wherein the turbine housing comprises: an inlet region for the supply of exhaust gas, the inlet region being arranged upstream of the at least one impeller; an outlet region for the discharge of exhaust gas, the outlet region being arranged downstream of and adjoining the at least one impeller; and at least one exhaust gas-conducting flow duct which connects the inlet region to the outlet region via the impeller; one or more overpressure lines which branch off from the at least one exhaust gas-conducting flow duct upstream of the outlet region and which opens into the exhaust gas discharge system downstream of the at least one impeller, and wherein, a self-controlling pressure valve is arranged in the overpressure line.

In some examples, the turbine may have more than one overpressure line, each overpressure line may further include a self-controlling pressure valve. The provided overpressure lines and their pressure valves may be disposed within an inlet region of the turbine, an outlet region of the turbine or any combination thereof. For example, an internal combustion engine system with turbine may include two overpressure lines one may be disposed within an inlet region of the turbine and one may be disposed within an outlet region. In this way, it may be possible to account for and subsequently release exhaust gases that are of a high and potentially dangerous pressure.

In one example embodiment of a turbine system within an internal combustion engine assembly, said internal combustion engine may comprise at least one turbine 200 that may include a turbine housing 202 in which there may be arranged at least one impeller 210 which may be mounted onto a rotatable shaft 212. The example internal combustion engine embodiment may further comprise a turbine housing 202 in which there may be positioned an inlet region 216 for the supply of exhaust gas and an outlet region 218 for the discharge of the supplied exhaust gas. The inlet region 216 may be arranged upstream of the at least one impeller 210 and may further include an exhaust gas-conducting flow duct 214 which may serve to connect the inlet 216 and outlet 218 regions of the engine embodiment.

The inlet region 216 of the provided example embodiment may be arranged in a position upstream from the at least one impeller 210 and the outlet region 218, which may be a constituent of an exhaust gas-discharge system 220 that may lie downstream of and may further adjoin the at least one impeller 210. The overpressure lines 204, 206 provided may be positioned such that they may branch off from the at least one exhaust gas-conducting flow duct 214 that may lie upstream of the outlet region 218 and may open into the exhaust gas discharge system 220 downstream of the impeller 210. Additionally, the overpressure lines 204, 206 may include self-controlling pressure valves 208 that may lie on the outlet side within the overpressure lines.

The turbine 200 of FIG. 2 may be radial turbine in which the flow of the working fluid of the turbine is radial with respect to the shaft onto which it may be affixed. In a radial turbine, the flow may be smoothly oriented at roughly 90 degrees by the compressor toward the combustion chamber. This may result in reduced mechanical and thermal stress, therefore potentially enabling a radial turbine to be simpler in design and more robust and efficient relative to axial turbines.

The provided example turbine 200 of FIG. 2 as briefly mentioned above, may include a turbine housing 202 which may serve to house the provided impeller 210 of the embodiment as well. The impeller 210 provided may be mounted onto a rotatable shaft such that an exhaust gas flow may approach the rotor blades of said impeller 210 radially. The turbine housing 202 of the example embodiment may comprise a spiral design surrounding an impeller 210 which may enable an exhaust gas to more easily flow in a radial pattern. A provided exhaust gas-conducting flow duct 214 may also extend in spiral form similarly to the turbine housing 202, such that the flow duct 214 may surround the impeller 210.

The turbine housing 202 may comprise an inlet region 216 for the supply of exhaust gas into the turbine and an outlet region 218 to be used as a discharge area for the previously supplied exhaust gas. The inlet region 214 may further be arranged upstream from the impeller 210. An example outlet region 218 of the turbine system 200 may comprise at least a portion of an example exhaust gas-discharge system 220 that may be arranged downstream from the provided impeller 210 and which may directly adjoin said impeller 210.

In one example embodiment of the provided subject matter, the turbine 200 may be a single-channel turbine in which an exhaust gas-conducting flow duct 214 may connect an inlet region 216 to an outlet region 218 via the provided impeller 210.

As one example, two overpressure lines 204, 206 may be provided wherein each overpressure line 204, 206 may branch off from an exhaust gas-conducting flow duct 214 that may lie within an inlet region 216 of the turbine system. Further, the inlet region 216 may lie upstream of an impeller 210. The over pressure lines 204, 206 may be positioned such that they open into an outlet region 218 that may lie downstream of the provided impeller 210 and may further include self-controlling pressure valves disposed along the inlet 216 side of the overpressure lines 204, 206. The overpressure lines 204, 206 may run rectilinearly and may be drilled into the housing 202 of the provided turbine system 200.

Turning now to FIG. 3, this figure shows a turbine 300 of a second example embodiment of an example internal combustion engine with a turbine system partially bisected along the shaft 312 of the turbine impeller 310. It will be understood that FIG. 3 as provided and described may be provided and described as such solely to explain the differences in relation to the embodiment illustrated in FIG. 2, for which reason reference is otherwise made to FIG. 2 and the associated description. Similar reference symbols have been used to illustrate common components within various provided embodiments. In other words the impeller of the example turbine system provided in FIG. 2 is represented by the reference symbol "210" and the impeller provided in the example turbine system of FIG. 3 is represented by the reference symbol "310." In this way, it may be easier to recognize common elements across multiple example embodiments provided herein.

In contrast to the example embodiment provided in FIG. 2, the illustrated overpressure lines 304, 306 of embodiment 300 may branch off from the example exhaust gas-conducting flow duct 314 of the impeller 310. The overpressure lines 304, 306 may include self-controlling pressure valves 308 that may be arranged along an outlet side of the overpressure lines 304, 306 because there may not be sufficient structural space for the space required by the valves 308 within an inlet side of the impeller 310. When the overpressure lines 304, 306 are opened, the pressure within the impeller 310 may be dissipated. This action of opening the overpressure lines 304, 306 by way of actuating the self-controlled pressure valves 308, may further result in the pressure within an inlet region 316 of the turbine system to be reduced as well.

Further, the overpressure lines 304, 306 may comprise two rectilinear sections, and may be likewise drilled. It will be understood that, the overpressure lines 204, 206 of embodiment 200 provided in FIG. 2 may be arranged within the turbine housing 202, whereas the overpressure lines 304, 306 of embodiment 300 as provided in FIG. 3 may run through the receptacle 350 of the turbine system which may comprise a cassette-like form of the variable turbine geometry. Thus the overpressure lines 304, 306 of embodiment 300 may run through the extended turbine housing 302 of embodiment 300.

Turning now to FIG. 3, this figure shows a further example embodiment of an internal combustion engine with a turbine assembly. In this example embodiment 300, the overpressure lines 304, 306 are shown branching off from the exhaust gas-conducting flow duct 314 in the impeller 310 area. The pressure valves 308 may be arranged as shown on the outlet side of the provided overpressure lines 304, 306 to account for a reduction of structural space for the valves 308 in the inlet side of the impeller 310 area. In this way, by opening the provided overpressure lines 304, 306 via actuating the pressure valves 308, the pressure within the impeller 310 area may be reduced or completely dissipated. By doing this, the pressure within an inlet region 116 of the example embodiment may also be reduced.

The example overpressure lines 304, 306 may comprise two rectilinear sections, and may further be likewise drilled. In contrast to the overpressure lines 204, 206 illustrated in FIG. 2 which are shown as being arranged within the turbine housing 202, the over pressure lines 304, 306 of FIG. 3 may run through the turbine receptacle, which may comprise a cassette-like form and may further comprise a variable turbine geometry, and thus, may extend through an extended turbine housing 202.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Figure 4:
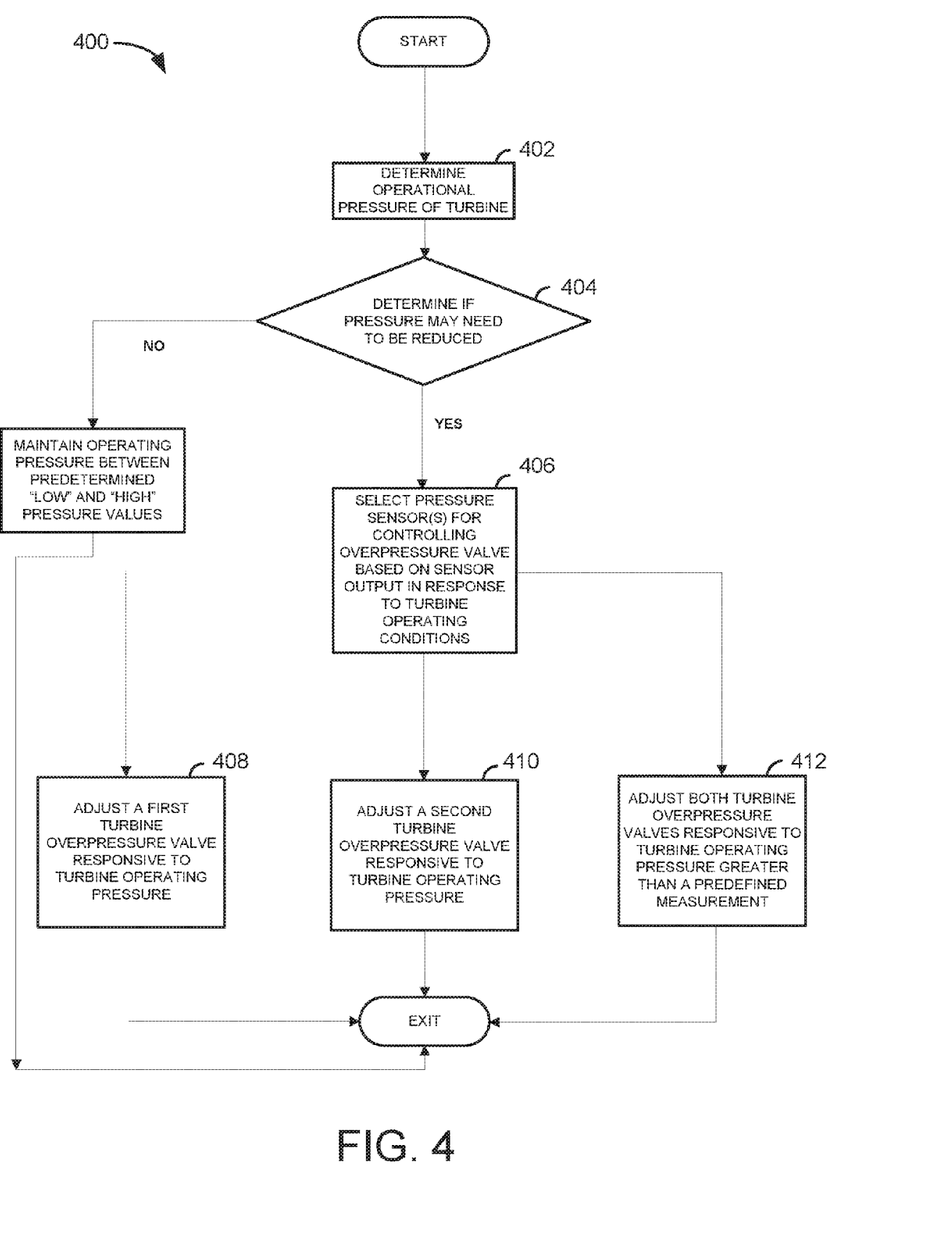
FIG. 4 shows a method for operating overpressure lines of a turbine.

FIG. 4 shows an example flowchart showing a method for an internal combustion engine comprising a turbine assembly includes, a first example operating condition in which pressure valve(s) of provided overpressure line(s) are/is not actuated, a second example operating condition in which a single pressure valve in an overpressure line upstream of the turbine's impeller may be actuated responsive to a pressure sensor output, a third operating condition in which a single pressure valve of a provided overpressure line downstream of the turbine's impeller is actuated responsive to a pressure sensor output, and a fourth operating condition in which the pressure valves within provided overpressure lines both upstream and downstream are actuated responsive to a pressure sensor output.

With respect to FIG. 4, an example flowchart diagram is provided which illustrates an example process by which the overpressure valves of provided overpressure lines may be actuated and controlled responsive to an output made by a pressure sensor within the turbine assembly. For example, a flow of exhaust gases may be provided into the turbine assembly via an internal combustion engine's exhaust system as shown in FIG. 1. Once the gas has been supplied to an inlet area of the turbine, the current operational pressure within the turbine assembly may be determined via a plurality of sensors and controls disposed within the engine and the turbine assembly. If the operational pressure within the turbine assembly of the present disclosure is within a predetermined set of values that are deemed safe operational pressures, then the turbine of the present disclosure will operate normally without the actuation of pressure valves within supplied overpressure lines of the turbine assembly. However, if the operating pressure of the turbine is above the predetermined range that has been recognized as being safe for the turbine, the pressure valves provided within the overpressure lines of example embodiments may be self-actuated responsive to a pressure output supplied by a pressure sensor of some kind within the provided overpressure lines. The provided pressure sensor(s) may allow the overpressure lines and thusly, the turbine assembly to operate at a plurality of speeds and loads that are defined by one or more operating conditions.

For example, the operating conditions mentioned above that may allow for operation of the turbine assembly and thusly the engine system as a whole, to operate within a predefined "safe" operating load. The operating loads may further comprise a first operating condition in which the operating pressure within a turbine assembly is determined to be safe, in which the pressure valves of the provided overpressure lines may not need to be opened, and thus, the turbine operates as it usually would when supplied with a safe operational pressure. Further operating conditions may comprise a second condition in which the turbine operational pressure As mentioned briefly above, if the pressure within the turbine assembly lies within a predetermined set of upper and lower limit pressure values, denoted in FIG. 4 as "high" and "low" values respectively, the sensors may not actuate the pressure valve(s) of the provided overpressure line(s). In this case, the operating fluid of the turbine, the engine's exhaust gas, is maintained within the inlet and outlet areas of the turbine's impeller area at a range within that of the predetermined "safe" operating range. However, if the operating pressure within the inlet or outlet section of the provided turbine assembly of various example embodiments is determined by a provided sensor to be higher than a predetermined "safe" operating pressure, a plurality of operating conditions relating to reducing the pressure within the turbine may be employed.

In a first operating condition in which the operating pressure of the turbine may be determined to be higher than a predetermined safe operating pressure, that is, if the pressure within the example turbine is above a specified nonzero value, and above a first high pressure value, but below a secondary predetermined high pressure value, one overpressure valve of a provided overpressure line may be opened. In example embodiments having more than one overpressure lines, one or more pressure valves may be opened to reduce the turbine's operating pressure to that of a "safe" value relative to their position with respect to flow of exhaust gas, such that a safe pressure may be maintained throughout the inlet and outlet areas. For example, if embodiment 200 of FIG. 2 is operating at a pressure higher than that of a first predetermined high pressure value, and below a second predetermined high pressure value, then only one pressure valve may be actuated. More specifically, for example, if the pressure upstream relative to the impeller 210 in the inlet section 216 is determined to be higher than a first predetermined high pressure value, the overpressure valve of the overpressure line upstream of the impeller may be opened. In a further example showing a second operating condition, if the pressure of the inlet region downstream of the impeller 210 is higher than a first predetermined high pressure value, and lower than a second predetermined high pressure value, the pressure valve 208 downstream of the impeller 210 in the inlet region of the turbine assembly may be opened. In this way, the pressure ratios at both the inlet 216 region and an outlet region 218 may be maintained.

For example, adjusting overpressure lines valve 204, 206 of embodiment 200 may include adjusting an actuator of the provided pressure valve(s) 208 in order to adjust the overall operating pressure of the turbine assembly.

In one example embodiment provided in FIG. 2, it will be appreciated that the first and second high pressure operating conditions of the turbine assembly provided may relate respectively, to conditions in which the pressure in an inlet region upstream and downstream of the impeller 210 are higher than a first predetermined high pressure value and below a second predetermined high pressure value. By doing this, it may be possible to control the flow of gas into the turbine at different stages while maintaining an overall pressure ratio at the turbine's inlet and outlet regions such that reducing the flow of exhaust gas via the pressure valves in provided overpressure lines does not negatively impact overall performance of the turbine and thusly the engine.

A third high pressure operating condition may also be provided such that in this condition, the turbine operates at a pressure higher than both a first and second predetermined high pressure value. In this third operating condition, more than one pressure valves may be actuated to result in a reduction of flow pressure within the turbine. For example, if the embodiment 200 provided in FIG. 2 were found to be operating at a pressure greater than both a first and second high pressure value, the pressure valves 208 of both overpressure lines 204, 206 may be actuated in a manner that may effectively reduce the operating pressure of the turbine. The valves 208 may open and close responsive to an output signal supplied by pressure sensors within the turbine for example, and may reduce the operating pressure within the turbine quickly such that a desirable pressure ratio between inlet and outlet regions may be maintained.

It will be appreciated that embodiments provided herein may allow for the use of overpressure lines that may be disposed within an inlet region as illustrated in FIG. 2 or overpressure lines disposed within an outlet region of the impeller's cassette-like receptacle as shown in FIG. 3, as well as embodiments where overpressure lines are disposed in both an inlet and outlet region (not shown) and any combination thereof.

An example technical effect of providing overpressure lines and pressure valves within the overpressure lines for the regulation of gases in order to maintain a "safe" operating pressure range, is that it may no longer be necessary to design turbines with a certain safety margin with respect to its dimensions. In other words, there is no need to design the turbine to be larger than is necessary for the exhaust gas mass flow to be handled. The resulting omission of said safety margin dimensionality may further result in the use of a smaller turbine, which may have a lower weight and may also be less voluminous. The behavior of the turbine and impeller may likewise be improved due to a possible lower inertia of the rotor used. The efficiency of the turbine assembly may also be improved with respect to relatively small exhaust gas mass flows resultant from using a smaller turbine and impeller.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An internal combustion engine comprising:
   an exhaust gas discharge system; and
   at least one turbine comprising at least a turbine housing, and an impeller mounted on a rotatable shaft, wherein the turbine housing comprises:
      an inlet region for a supply of exhaust gas, the inlet region being arranged upstream of the at least one impeller;
      an outlet region for discharge of the exhaust gas, the outlet region being arranged downstream of the at least one impeller and adjoining the at least one impeller;
      at least one exhaust gas-conducting flow duct which connects the inlet region to the outlet region via the impeller; and
      one or more overpressure lines which branches off from the at least one exhaust gas-conducting flow duct upstream of the outlet region and which opens into the exhaust gas discharge system downstream of the at least one impeller, and wherein, a self-controlling pressure valve is arranged in the overpressure line, the pressure valve being arranged at an outlet side in the overpressure line, the turbine being equipped with a variable turbine geometry which comprises adjustable guide vanes, arranged in the inlet region of the turbine for influencing flow direction, wherein the overpressure line runs through a receptacle of the turbine which comprises a cassette-like form interior to and spaced away from the turbine housing.

2. The internal combustion engine of claim 1, wherein at least one overpressure line opens into the outlet region downstream of at least one impeller.

3. The internal combustion engine of claim 2, wherein at least one overpressure line branches off from at least one exhaust gas-conducting flow duct in at least one impeller.

4. The internal combustion engine of claim 3, wherein at least one overpressure line branches off from at least one exhaust gas-conducting flow duct in the inlet region upstream of at least one impeller.

5. The internal combustion engine of claim 4, wherein the pressure valve is arranged at an inlet side of the overpressure line.

6. The internal combustion engine of claim 1, wherein at least two overpressure lines are provided.

7. The internal combustion engine of claim 1, wherein the turbine housing is a monolithic cast housing.

8. The internal combustion engine of claim 1, wherein the turbine housing is of modular construction.

9. The internal combustion engine of claim 1, wherein the turbine is a radial turbine.

10. The internal combustion engine of claim 1, wherein the turbine is an axial turbine.

11. The internal combustion engine of claim 1, wherein the turbine is the turbine of an exhaust gas turbocharger.

12. A method, comprising:
    via a controller, adjusting first and second overpressure relief valves of an engine exhaust turbine over-pressure line responsive to sensed engine operating conditions, the over-pressure line running through a receptacle of a turbine which comprises a cassette-like form positioned inside and spaced away from a turbine housing, the receptacle receiving variable vanes of a variable geometry turbocharger,
    wherein an engine includes an exhaust passage with the turbine having at least the turbine housing, and an impeller mounted on a rotatable shaft, wherein the turbine housing comprises: an inlet region for a supply of exhaust gas, the inlet region being arranged upstream of the at least one impeller; an outlet region for discharge of the exhaust gas, the outlet region being arranged downstream of the at least one impeller and adjoining the at least one impeller; and at least one exhaust gas-conducting flow duct which connects the inlet region to the outlet region via the impeller; the overpressure line branching off from the at least one exhaust gas-conducting flow duct upstream of the outlet region and opening into an exhaust gas discharge system downstream of the at least one impeller.

13. The method of claim 12, wherein the first and second valves are actuated responsive to a plurality of operating conditions comprising:
    a first condition in which only the first pressure valve is opened responsive to a pressure sensor output at a first, lowest level,
    a second condition in which only the second pressure valve is opened responsive to a pressure sensor output at a second level higher than the first level, and
    a third condition in which both the first and second valves are opened responsive to a pressure sensor output at a third level higher than the second level.

* * * * *